(12) United States Patent
Segall

(10) Patent No.: US 8,665,942 B2
(45) Date of Patent: Mar. 4, 2014

(54) METHODS AND SYSTEMS FOR INTER-LAYER IMAGE PREDICTION SIGNALING

(75) Inventor: Christopher A. Segall, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1664 days.

(21) Appl. No.: 11/626,368

(22) Filed: Jan. 23, 2007

(65) Prior Publication Data

US 2008/0175496 A1 Jul. 24, 2008

(51) Int. Cl.
*H04N 7/12* (2006.01)
*H04N 7/48* (2006.01)
*H04N 7/32* (2006.01)
*H04N 9/797* (2006.01)
*H04N 7/50* (2006.01)

(52) U.S. Cl.
USPC .............. 375/240; 375/240.1; 375/240.11

(58) Field of Classification Search
None
See application file for complete search history.

(56) References Cited

U.S. PATENT DOCUMENTS

| | | | |
|---|---|---|---|
| 5,105,267 A | 4/1992 | Hayashi | |
| 5,448,379 A | 9/1995 | Ishihara et al. | |
| 5,500,677 A | 3/1996 | Fert | |
| 5,603,012 A | 2/1997 | Sotheran | |
| 5,748,858 A | 5/1998 | Ohtsuka et al. | |
| 5,777,678 A | 7/1998 | Ogata et al. | |
| 5,786,908 A | 7/1998 | Liang | |
| 5,832,120 A | 11/1998 | Prabhakar et al. | |
| 5,930,397 A | 7/1999 | Tsujii et al. | |
| 5,960,110 A | 9/1999 | Usami | |
| 6,057,884 A | 5/2000 | Chen et al. | |
| 6,075,573 A | 6/2000 | Shyu | |
| 6,081,209 A * | 6/2000 | Schuyler et al. | ............... 341/51 |
| 6,100,999 A | 8/2000 | Ikegami | |
| 6,301,393 B1 | 10/2001 | Spaulding et al. | |
| 6,396,422 B1 | 5/2002 | Barkan | |
| 6,396,595 B1 | 5/2002 | Shimazaki | |
| 6,400,996 B1 | 6/2002 | Hoffberg et al. | |
| 6,490,320 B1 | 12/2002 | Vetro | |
| 6,493,386 B1 | 12/2002 | Vetro | |
| 6,574,279 B1 | 6/2003 | Vetro | |

(Continued)

FOREIGN PATENT DOCUMENTS

| | | |
|---|---|---|
| EP | 0644695 | 3/1995 |
| EP | 0966162 | 12/1999 |

(Continued)

OTHER PUBLICATIONS

ITU-T Recommendation H.264 (Mar. 2005).*

(Continued)

*Primary Examiner* — Dave Czekaj
*Assistant Examiner* — David N Werner
(74) *Attorney, Agent, or Firm* — Brooks Acordia IP Law, P.C.; Pejman Yedidsion; David Ripma

(57) ABSTRACT

Embodiments of the present invention comprise systems and methods for predicting high dynamic range image blocks, wherein the systems and methods comprise a first image block and a second image block, where a received first prediction data of the first image block and a received prediction difference data of the second image block may be combined to determine a second prediction data for the second image block.

16 Claims, 8 Drawing Sheets

(56) References Cited

U.S. PATENT DOCUMENTS

| | | | |
|---|---|---|---|
| 6,697,426 B1 | 2/2004 | Van Der Schaar et al. | |
| 6,748,020 B1 | 6/2004 | Eifrig et al. | |
| 6,765,931 B1 | 7/2004 | Rabenko | |
| 6,795,501 B1 | 9/2004 | Zhu et al. | |
| 6,829,301 B1 | 12/2004 | Tinker et al. | |
| 6,850,252 B1 | 2/2005 | Hoffberg | |
| 6,867,717 B1 | 3/2005 | Ion et al. | |
| 6,879,731 B2 | 4/2005 | Kang et al. | |
| 6,895,052 B2 | 5/2005 | Hanamura et al. | |
| 6,968,007 B2 | 11/2005 | Barrau | |
| 6,996,173 B2 | 2/2006 | Wu | |
| 7,006,881 B1 | 2/2006 | Hoffberg et al. | |
| 7,010,174 B2 | 3/2006 | Kang et al. | |
| 7,239,721 B1* | 7/2007 | Kumar et al. | 382/107 |
| 7,339,993 B1* | 3/2008 | Brooks et al. | 375/240.26 |
| 7,447,354 B2 | 11/2008 | Sasaki et al. | |
| 7,457,474 B1 | 11/2008 | Haskell et al. | |
| 7,535,383 B2 | 5/2009 | Segall et al. | |
| 8,085,852 B2* | 12/2011 | Liu et al. | 375/240.25 |
| 2002/0054638 A1 | 5/2002 | Hanamura | |
| 2002/0154694 A1 | 10/2002 | Birch | |
| 2003/0035488 A1 | 2/2003 | Barrau | |
| 2003/0043908 A1 | 3/2003 | Gao | |
| 2003/0112863 A1 | 6/2003 | Demos | |
| 2003/0194007 A1 | 10/2003 | Chen | |
| 2004/0001547 A1 | 1/2004 | Mukherjee | |
| 2004/0013309 A1* | 1/2004 | Choi et al. | 382/238 |
| 2004/0151249 A1 | 8/2004 | Morel | |
| 2005/0013501 A1* | 1/2005 | Kang et al. | 382/254 |
| 2005/0030315 A1 | 2/2005 | Cohen et al. | |
| 2005/0135477 A1 | 6/2005 | Zhang et al. | |
| 2005/0147163 A1 | 7/2005 | Li | |
| 2005/0254722 A1 | 11/2005 | Fattal et al. | |
| 2005/0259729 A1* | 11/2005 | Sun | 375/240.1 |
| 2006/0002611 A1 | 1/2006 | Mantiuk et al. | |
| 2006/0077405 A1 | 4/2006 | Topfer et al. | |
| 2006/0083303 A1 | 4/2006 | Han et al. | |
| 2006/0104533 A1 | 5/2006 | Daly et al. | |
| 2006/0126962 A1 | 6/2006 | Sun | |
| 2006/0153294 A1 | 7/2006 | Wang et al. | |
| 2006/0181618 A1 | 8/2006 | Kameyama | |
| 2006/0200253 A1 | 9/2006 | Hoffberg et al. | |
| 2006/0200258 A1 | 9/2006 | Hoffberg et al. | |
| 2006/0200259 A1 | 9/2006 | Hoffberg et al. | |
| 2006/0200260 A1 | 9/2006 | Hoffberg et al. | |
| 2006/0209959 A1 | 9/2006 | Sun | |
| 2006/0210185 A1 | 9/2006 | Sun | |
| 2006/0221760 A1 | 10/2006 | Chen | |
| 2006/0251330 A1 | 11/2006 | Toth et al. | |
| 2007/0019872 A1 | 1/2007 | Birinov et al. | |
| 2007/0140354 A1 | 6/2007 | Sun | |
| 2007/0160133 A1 | 7/2007 | Bao et al. | |
| 2007/0160153 A1 | 7/2007 | Sullivan | |
| 2007/0201560 A1 | 8/2007 | Segall | |
| 2007/0258641 A1 | 11/2007 | Srinivasan et al. | |
| 2007/0269104 A1 | 11/2007 | Whitehead et al. | |
| 2008/0175494 A1 | 7/2008 | Segall | |
| 2008/0175495 A1 | 7/2008 | Segall | |
| 2008/0175496 A1 | 7/2008 | Segall | |
| 2008/0175497 A1 | 7/2008 | Segall | |
| 2008/0192819 A1 | 8/2008 | Ward et al. | |
| 2008/0219575 A1 | 9/2008 | Wittenstein | |
| 2008/0253672 A1 | 10/2008 | Segall | |
| 2009/0175338 A1 | 7/2009 | Segall | |

FOREIGN PATENT DOCUMENTS

| | | | | |
|---|---|---|---|---|
| EP | 1170954 A1 | 1/2002 | | |
| EP | 1195992 A1 | 4/2002 | | |
| EP | 1248466 A1 | 10/2002 | | |
| JP | 2005-056271 | 3/1993 | | |
| JP | 7162870 | 6/1995 | | |
| JP | 9070044 | 3/1997 | | |
| JP | 9182085 | 7/1997 | | |
| JP | 1018085 | 1/1999 | | |
| JP | 11018085 A2 | 1/1999 | | |
| JP | 11331613 | 11/1999 | | |
| JP | 2000184337 | 6/2000 | | |
| JP | 2004-363931 | 12/2004 | | |
| JP | 2005-80153 | 3/2005 | | |
| JP | 2005-094054 | 4/2005 | | |
| JP | 2005-167431 | 6/2005 | | |
| WO | WO 2005/104035 A1 | 11/2005 | | |
| WO | WO 2005104035 A1 * | 11/2005 | | G06T 9/00 |
| WO | WO 2007/082562 A2 | 7/2007 | | |
| WO | 2008049446 A1 | 5/2008 | | |

OTHER PUBLICATIONS

Non-Final Office action for U.S. Appl. No. 11/626,370 mailed Oct. 18, 2011.
Japanese Office action dated Mar. 23, 2010, relating to Japanese Patent Application No. 2007-044489.
English Translation of Japanese Decision of Refusal Office Action dated Mar. 23, 2010.
Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201; 22$^{nd}$ Meeting: Marrakech, Morocco, Jan. 13-19, 2007.
Andrew Segall, "SVC-to-AVC Bit-stream Rewriting for Coarse Grain Scalability", Joint Video Team(JVT) of ISO/IEC MPEG $ ITU-T VCEG (ISO/IEC JTC1/SC29/WG11 and ITU-T SG16 Q.6) 20$^{th}$ Meeting: Klagenfurt, Austria, Jul. 15-21, 2006, JVT-T061.
F. Durand and J. Dorsey, "Fast Bilateral Filtering for the Display of High-Dynamic-Range Images", Proceedings of SIGGRAPH, San Antonio, TX, Jul. 21-26, 2002.
R. Fattal, D. Lischinski and M. Werman, "Gradient Domian High Dynamic Range Compression", Proceedings of SIGGRAPG, San Antonio, TX, Jul. 21-26, 2002.
L. Meylan and S. Susstrunk, "High Dynamic Range Image Rendering with a Retinex-Based Adaptive Filter", IEEE Transactions on Image Processing, Sep. 2005.
Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.
E. Reinhard, M. Stark, P. Shirley and J. Ferwerda, "Photographic Tone Reproduction for Digital Images", Proceedings of SIGGRAPH, San Antonio, TX, Jul. 21-26, 2002.
G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.
Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.
H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.
H. Seetzen, G. Ward, and L. Whitehead, "High Dynamic Range Display Using Low and High Resolution Modulators," The Society for Information Display International Symposium, Baltimore, Maryland, May 2003.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China relevant sections 5 and 6.
Julien Reichel, Heiko Schwarz and Mathias Wien, "Scalable Video Coding—Working Draft 4", JVT-Q201, Nice, FR, Oct. 2005.
Notice of Allowance for U.S. Appl. No. 11/626,367 mailed Jul. 2, 2010.
Non-Final Office action for U.S. Appl. No. 11/362,571 dated May 12, 2010.

(56) References Cited

OTHER PUBLICATIONS

Rafal Mantiuk, Alexander Efremov, Karol Myszkowski, Hans-Peter Seidel, Backward Compatible High Dynamic Range MPEG Video Compression, In: Proc. of SIGGRAPH, Jul. 2006.

Internation Telecommunication Union, ISO/IEC 13818-2 MPEG-2, Geneva, ITU H.262, Jul. 1995.

Lin, Y.C; Wang, C-N;Chiang, T; Vetro, A; Sun, H, "Efficient FGS to Single Layer Transcoding", IEEE International Conference on Consumer Electronics, pp. 134-135, Jun. 2002.

Y Li, L. Sharan and E. Adelson, "Compressing and companding High Dynamic Range Images with Subband Architectures", ACM Transactions on Graphics, Jul. 2005.

G. Ward and M. Simmons, "JPEG-HDR: A Backwards-Compatible, High Dynamic Range Extension to JPEG,"Proceedings of the Thirteenth Color Imaging Conference, AZ, Nov. 2005.

Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005.

R. Mantiuk, G. Krawczyk, K. Myszkowski and H.P. Seidel, "Perception-Motivated High Dynamic Range Video Encoding", ACM Transactions on Graphics, Aug. 2004.

*Ex Parte Quayle* Action for U.S. Appl. No. 11/626,367 dated Feb. 24, 2010.

Final Office for U.S. Appl. No. 11/626,367 dated Jun. 11, 2010.

Non-Final Office Action for U.S. Appl. No. 11/626,370 dated Jun. 21, 2011.

International Telecommunication Union, Series H: Audiovisual and Multimedia Systems; Video coding for low bit rate communication; H.263, Geneva, Jan. 2005.

International Organisation for Standardisation, MPEG-4 Version 2 Visual Working Draft Rev 5.0, Atlantic City, Oct. 1998.

Internation Telecommunication Union, ISO/IEC 13818-2 MPEG-2, Geneva, 1995.

International Telecommunication Union, Series H: Audiovisual and Multimedia Systems; Coding of Moving Video; H.264, Mar. 2005.

Joint Video Team (JVT) of ISO/IEC MPEG & ITU-T VCEG,Advanced video coding for generic audiovisual services, ISO/IEC 14496-10, JVT-T201, Austria, Jul. 2006.

Non-Final Office action for U.S. Appl. No. 11/626,366 mailed Jun. 13, 2011.

Final Office action for U.S. Appl. No. 11/626,366 mailed Jan. 18, 2012.

International Search Report for PCT/JP2007/050277 mailed May 1, 2007.

International Search Report for PCT/JP2007/064040 mailed Oct. 2, 2007.

Notice of Allowance for Application No. 11/626,370 mailing date Apr. 2, 2012.

Notice of Allowance for U.S. Appl. No. 11/626,366 mailed Mar. 29, 2013.

\* cited by examiner

METHODS AND SYSTEMS FOR INTER-LAYER IMAGE PREDICTION SIGNALING

FIELD OF THE INVENTION

Embodiments of the present invention comprise methods and systems for inter-layer image prediction signaling.

SUMMARY

Some embodiments of the present invention comprise methods and systems for prediction of images comprising multiple dynamic range layers. Some embodiments comprise methods and systems for communicating prediction variables between an encoder and a decoder or transcoder.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1A:
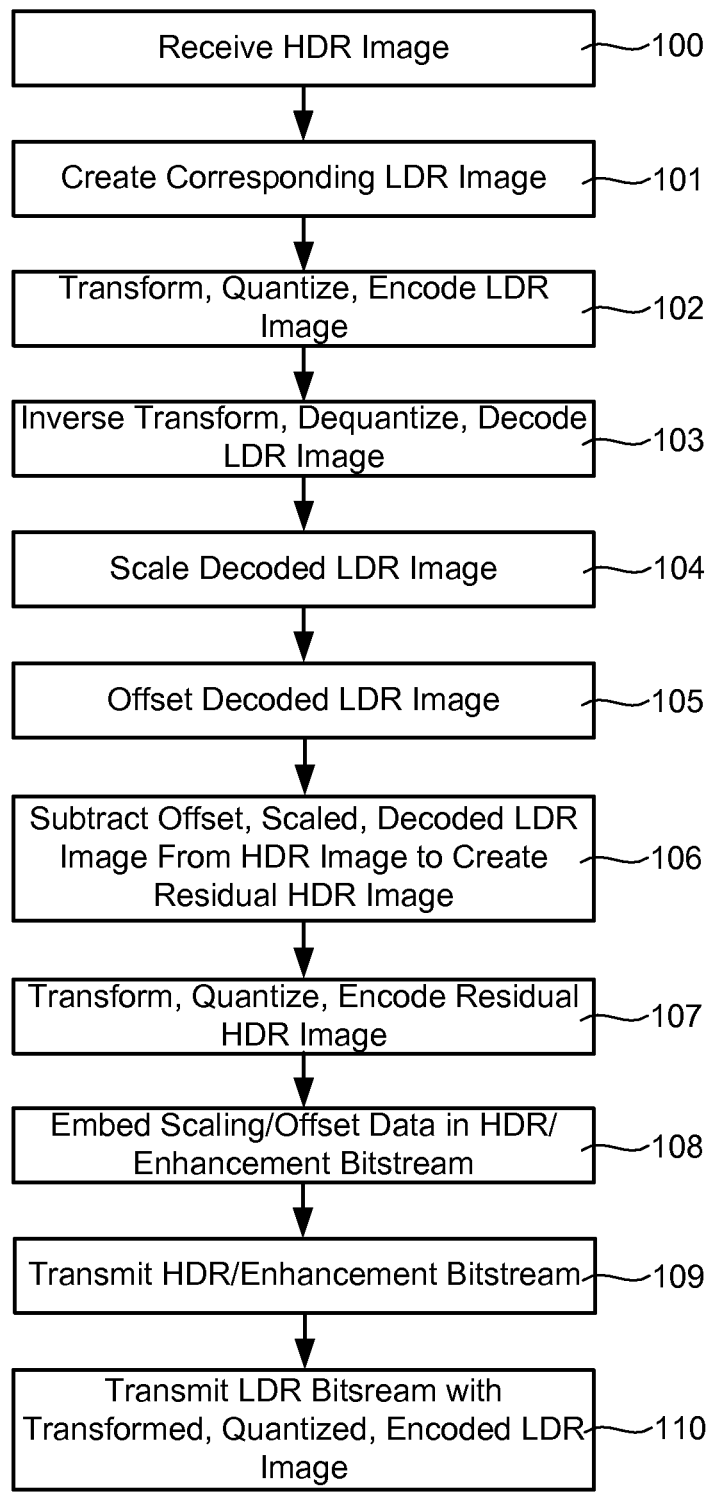
FIG. 1A is a chart showing an exemplary embodiment of the present invention comprising prediction with a scaled and offset LDR image element.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise systems and methods for using the low dynamic range video sequence to predict the high dynamic range version of the image data. This may be referred to as inter-layer prediction in this application. Some embodiments of the present invention comprise a spatially-varying inter-layer prediction mechanism for HDR video coding. Some embodiments of the present invention comprise an inter-layer prediction mechanism for HDR video coding that operates in the color spaces utilized for video compression and transmission. Some embodiments utilize gamma corrected color spaces. Exemplary embodiments may utilize xvYCC and YCbCr color spaces. Some embodiments of the present invention comprise an inter-layer prediction mechanism for HDR video coding that may be disabled spatially. Some embodiments of the present invention comprise an inter-layer prediction mechanism for HDR video coding that is multiplication free. Some embodiments of the present invention comprise an inter-layer prediction mechanism for HDR video coding that can be utilized in a single-loop decoder. Some embodiments may also be incorporated into multi-loop designs.

Embodiments of the present invention comprise an inter-layer prediction technique for high-dynamic range video coding. Some aspects of some embodiments comprise elements described in U.S. patent application Ser. No. 11/362,571 filed on Feb. 24, 2006, which is hereby incorporated herein by reference. Some embodiments of the present invention comprise a method for projecting decoded low dynamic range data to the high dynamic range coding space. This process may be referred to as inter-layer prediction.

An analogous process to inter-layer prediction for high dynamic range video coding is inter-layer prediction for bit-depth scalability. In the problem for bit-depth scalability, the baselayer of a video bit-stream contains a representation of the video sequence at a reduced bit-depth. For example, the baselayer may contain an eight-bit representation of the sequence, while the enhancement layer of the bit-stream may contain a ten-bit representation. In some scenarios, more than two layers may be used. In some scenarios, an eight-bit version may represent the eight most significant bits of the higher bit-depth sequence. The higher bit-depth version is therefore predicted by multiplying (or equivalently scaling) the decoded lower bit-depth data by the higher bit-depth. In this specific example, the eight-bit data would be decoded and subsequently scaled by a factor of four to predict the ten-bit data. This scaling may be done in either the intensity or transform domain, depending on the application.

High dynamic range video coding can be a more general case of bit-depth scalability. The baselayer and enhancement layer may contain data represented with different bit-depths.

However, the baselayer may not be constrained to represent the most significant bits of the enhancement layer data. In some embodiments of the present invention, the baselayer data may contain a lower bit-depth representation of the high dynamic range sequence, and this lower bit-depth may not always correspond to the most significant bits of the corresponding higher bit-depth representation.

Some embodiments of the present invention may be described with reference to FIG. 1A. In these embodiments, a high dynamic range (HDR) image is received 100. A corresponding low dynamic range (LDR) image may also be received 101 or created from the HDR image. The LDR image may be created through a tone scale operation, a conversion function or some other method. The LDR image may then be predicted, transformed, quantized and encoded 102 as is well known in the art. In a few exemplary embodiments the LDR image may be transformed using a discrete cosine transform (DCT), a wavelet transform or by other common transformation methods. The prediction, transformation, quantization and encoding processes may then be substantially reversed 103 to provide a decoded LDR image as would be decoded at a typical decoder. Typically, a de-quantization process is lossy and therefore does not produce an exact copy of the originally encoded image. Other processes may also affect the reproduction of the original LDR image. Regardless, the decoded LDR image may be processed by one or more of the following methods: color conversion, scaling 104 and offsetting 105. The decoded, processed LDR image may now be used to create 106 a residual HDR image. This may be performed by subtracting the decoded, processed LDR image from the original HDR image. Other methods may also be used.

The residual HDR image may then be transformed, quantized and encoded 107 or otherwise prepared for transmission to a destination. This step may comprise embedding the encoded residual HDR image into an HDR or enhancement layer bitstream. Information related to the color conversion, scaling and offset operations may also be encoded and embedded 108 in the HDR or enhancement bitstream. The HDR/enhancement layer bitstream may then be transmitted 109 to a destination. An LDR/baselayer bitstream may also be transmitted 110 to the destination. The LDR/baselayer bitstream may also comprise a transformed, quantized and encoded LDR image.

A decoder receiving the LDR/baselayer bitstream may then decode the LDR/baselayer image. A decoder receiving the LDR/baselayer bitstream and the HDR/enhancement layer bitstream may decode both the LDR/baselayer image and the HDR/enhancement layer image. Embodiments of the present invention comprise methods and systems for encoding and decoding images in this framework and similar scenarios.

Figure 1B:
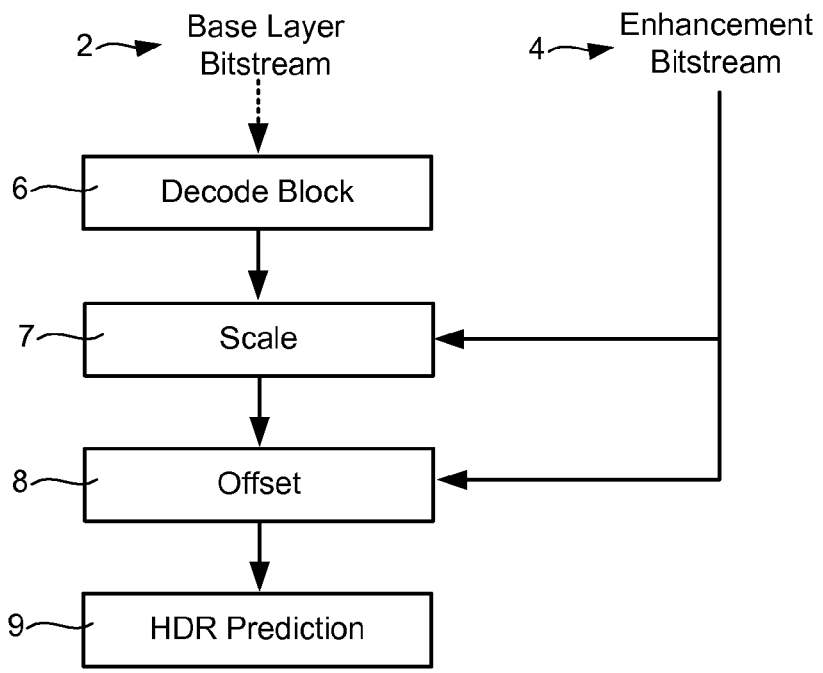
FIG. 1B is a chart showing an exemplary embodiment of the present invention comprising scaling and offsetting decoded image elements for HDR prediction.

Some embodiments of the present invention may be described with reference to FIG. 1B. In these embodiments, a baselayer decoder may receive baselayer data, such as from a baselayer bitstream 2. The baselayer decoder may decode 6 a baselayer block or other image element and represent it in the spatial domain. Some embodiments may comprise full decoding of the block, including a prediction process followed by residual refinement. Some embodiments may comprise reconstruction of the residual only. In some embodiments, the spatial information in the baselayer may be utilized to predict the high dynamic range signal. Some embodiments may comprise scaling 7 the baselayer information. Some embodiments may also comprise adding an offset 8 to the baselayer information. Some embodiments may comprise both scaling 7 and adding an offset 8. Once scaling 7 and/or adding an offset 8 are performed on the decoded baselayer information, that scaled, offset information may be used to predict 9 an enhancement layer, such as a higher dynamic range (HDR) layer. In some embodiments, scaling 7 and offset 8 data may be extracted from an enhancement layer 4 bitstream. In some embodiments, subsequent refinement may be decoded from the enhancement layer bit-stream 4.

Figure 2:
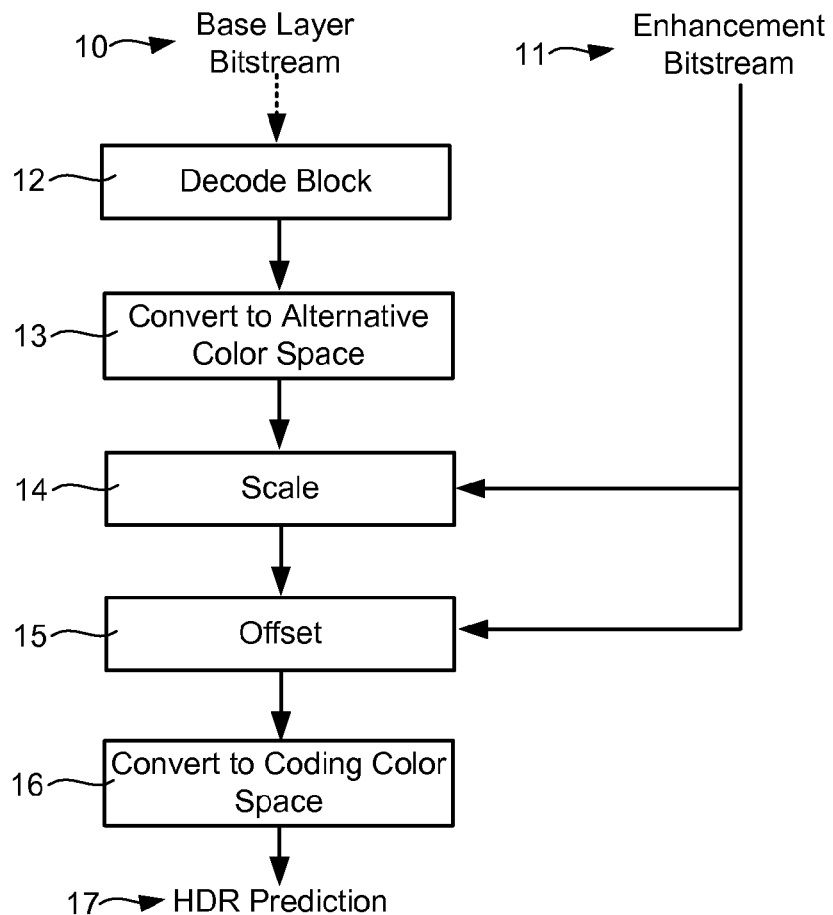
FIG. 2 is a chart showing an exemplary embodiment of the present invention comprising conversion to an alternative color space.

Some embodiments of the present invention may be described with reference to FIG. 2. In these embodiments, a decoder may receive baselayer data 10 from which a block or other image element may be decoded 12 into spatial image data. This spatial image data may then be converted 13 to an alternative color space. This converted data may then be scaled 14 and/or offset 15. Scaling and offset operations may be performed according to instructions and/or data received from an enhancement bitstream 11. This converted, scaled and/offset data may then be converted 16 back to the coding color space. Once converted back to the coding color space, the scaled and/or offset data may be used to predict 17 an enhancement layer, such as a higher dynamic range (HDR) layer.

Figure 3:
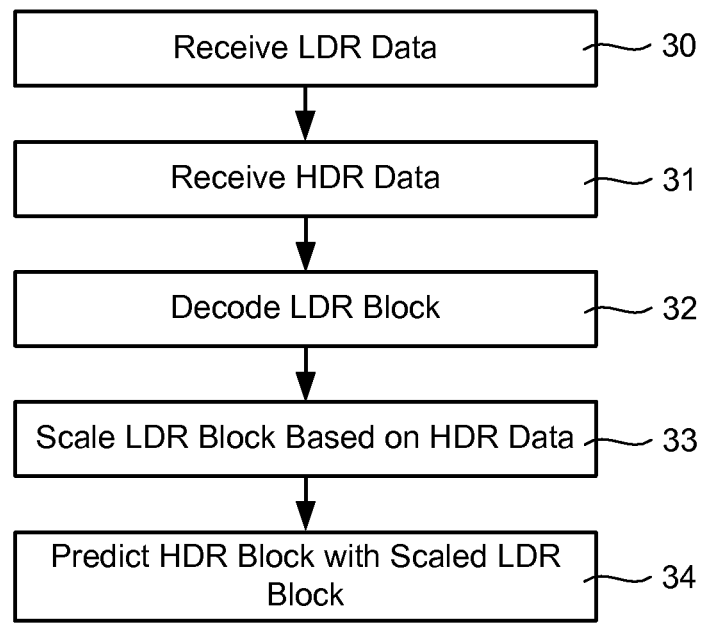
FIG. 3 is a chart showing an exemplary embodiment of the present invention comprising scaling an LDR image element according to HDR bitstream data.

Some embodiments of the present invention may be described with reference to FIG. 3. In these embodiments, an LDR/baselayer image is received 30 and corresponding HDR/enhancement layer data is also received 31. An LDR/baselayer block or image element is then decoded 32 from the LDR/baselayer image. The decoded LDR/baselayer image element is then scaled 33. This scaling may be performed according to data embedded in the HDR/enhancement layer data. Scaling of individual image elements may be related to or a function of image characteristics comprising spatial location, luminance data, chrominance data and other data. The scaled, decoded LDR/baselayer image may then be used to predict 34 a corresponding HDR block or image element. In some embodiments, the scaled, decoded LDR/baselayer image element may be added to a corresponding decoded residual image element to form an HDR/enhancement layer image element.

Figure 4:
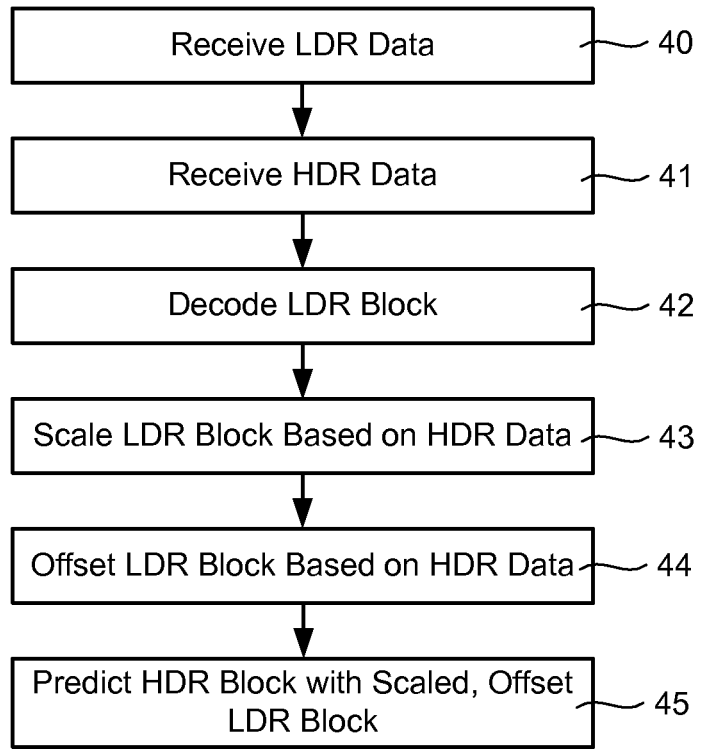
FIG. 4 is a chart showing an exemplary embodiment of the present invention comprising scaling and applying an offset to an LDR image element according to HDR bitstream data.

Some embodiments of the present invention may be described with reference to FIG. 4. In these embodiments, an LDR/baselayer image is received 40 and corresponding HDR/enhancement layer data is also received 41. An LDR/baselayer block or image element is then decoded 42 from the LDR/baselayer image. The decoded LDR/baselayer image element is then scaled 43. This scaling may be performed according to data embedded in the HDR/enhancement layer data. Scaling of individual image elements may be related to or a function of image characteristics comprising spatial location, luminance data, chrominance data and other data. An offset may then be added 44 to the scaled LDR image element. Offset data may be carried in the corresponding HDR/enhancement layer data. Offset data may vary between image elements and may be dependent on image characteristics comprising spatial location, luminance data, chrominance data and other data.

The scaled, offset and decoded LDR/baselayer image may then be used to predict 45 a corresponding HDR block or image element. In some embodiments, the scaled, offset and decoded LDR/baselayer image element may be added to a corresponding decoded residual image element to form an HDR/enhancement layer image element.

Figure 5:
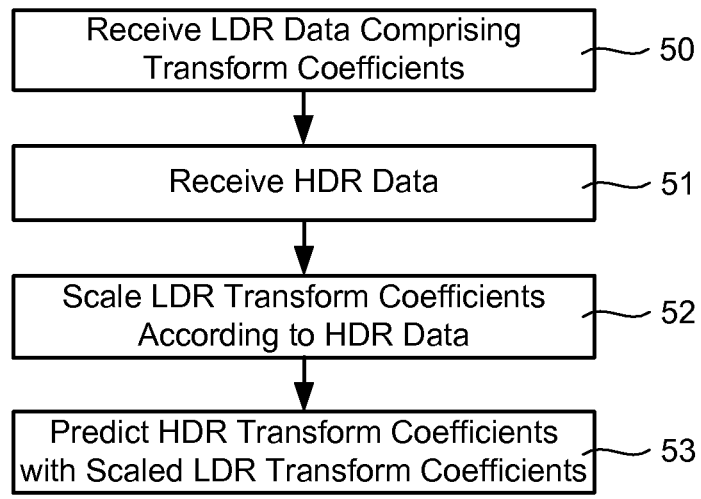
FIG. 5 is a chart showing an exemplary embodiment of the present invention comprising scaling LDR transform coefficients for HDR prediction.

Some embodiments of the present invention may be described with reference to FIG. 5. In these embodiments, an LDR/baselayer image comprising LDR transform coefficients is received 50 and corresponding HDR/enhancement layer data is also received 51. The LDR/baselayer image transform coefficients may then be scaled 52. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer transform coefficients may then be used to predict 53 transform coefficients for a corresponding HDR block or image element.

Figure 6:
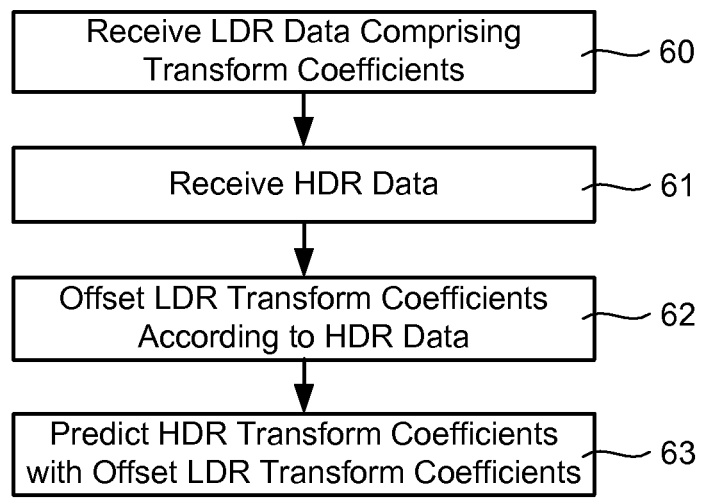
FIG. 6 is a chart showing an exemplary embodiment of the present invention comprising applying an offset to LDR transform coefficients for HDR prediction.

Some embodiments of the present invention may be described with reference to FIG. 6. In these embodiments, an LDR/baselayer image comprising LDR transform coefficients is received 60 and corresponding HDR/enhancement layer data is also received 61. The LDR/baselayer image transform coefficients may then be offset 62. Offset data may be carried in the corresponding HDR/enhancement layer data 61. Offset data may vary between image elements and may be dependent on image characteristics comprising spatial location, luminance data, chrominance data and other data. The offset LDR/baselayer transform coefficients may then be used to predict 63 transform coefficients for a corresponding HDR block or image element.

Figure 7:
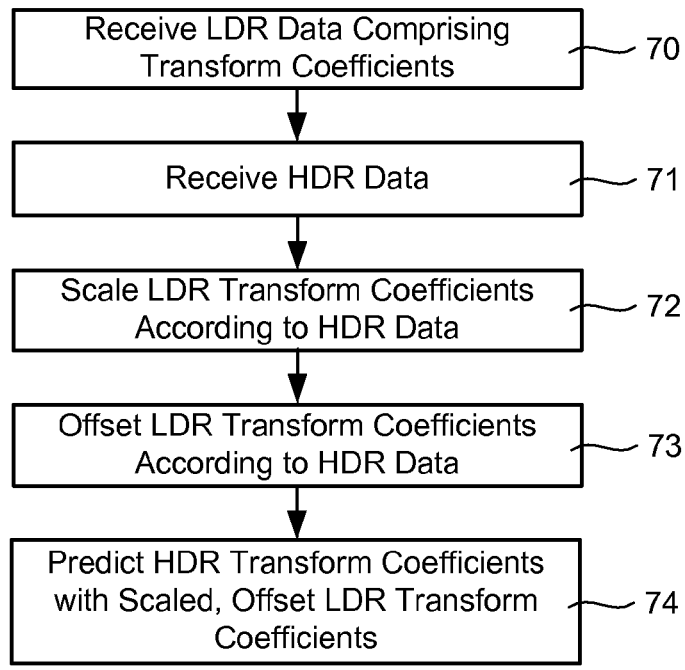
FIG. 7 is a chart showing an exemplary embodiment of the present invention comprising scaling LDR transform coefficients and applying an offset to LDR transform coefficients for HDR prediction.

Some embodiments of the present invention may be described with reference to FIG. 7. In these embodiments, an LDR/baselayer image comprising LDR transform coefficients is received 70 and corresponding HDR/enhancement layer data is also received 71. The LDR/baselayer image transform coefficients may then be scaled 72. This scaling may be performed according to data embedded in the HDR/enhancement layer data. Scaling of LDR transform coefficients may be related to or a function of image characteristics comprising spatial location, luminance data, chrominance data and other data. The scaled LDR/baselayer image transform coefficients may then be offset 73. Offset data may be carried in the corresponding HDR/enhancement layer data 71. Offset data may vary between image elements and may be dependent on image characteristics comprising spatial location, luminance data, chrominance data and other data. The scaled, offset LDR/baselayer transform coefficients may then be used to predict 74 transform coefficients for a corresponding HDR block or image element.

Figure 8:
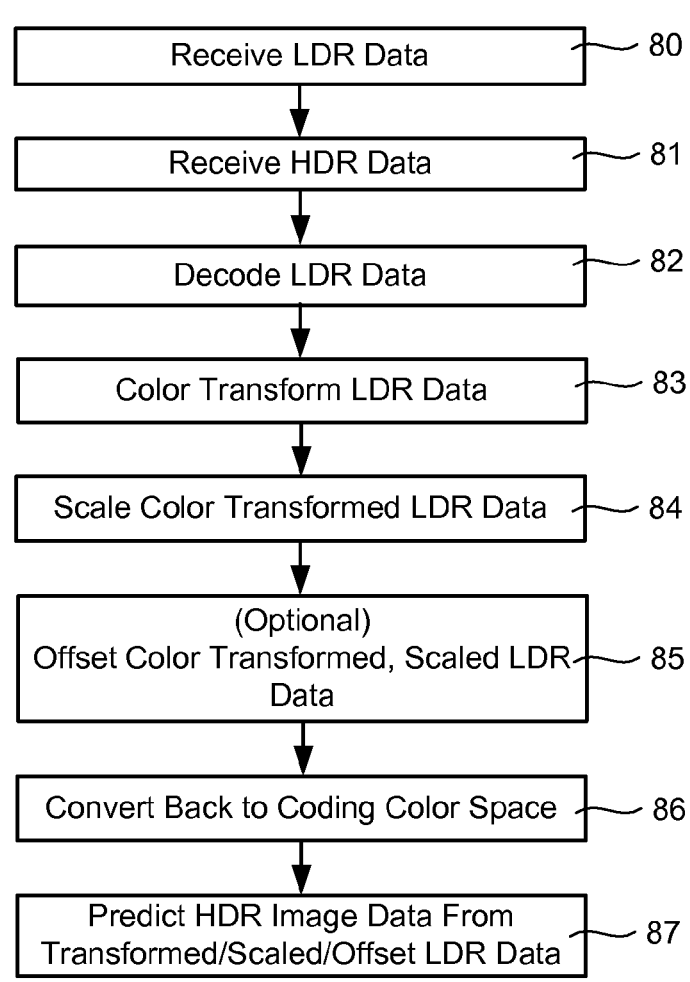
FIG. 8 is a chart showing an exemplary embodiment of the present invention comprising scaling and applying an offset to color-transformed image elements for HDR prediction.

Some embodiments of the present invention may be described with reference to FIG. 8. In these embodiments, an LDR/baselayer image is received 80 and corresponding HDR/enhancement layer data is also received 81. An LDR/baselayer block or image element is then decoded 82 from the LDR/baselayer image. The decoded LDR/baselayer image element may then be converted 83 or transformed to an alternative color format or color space. While in this alternative color space, the LDR image element may be scaled 84. This scaling may be performed according to data embedded in the HDR/enhancement layer data. Scaling of individual image elements may be related to or a function of image characteristics comprising spatial location, luminance data, chrominance data and other data. Also, while in the alternative color space, an offset may then be added 85 to the scaled, color-converted LDR image element. Offset data may be carried in the corresponding HDR/enhancement layer data. Offset data may vary between image elements and may be dependent on image characteristics comprising spatial location, luminance data, chrominance data and other data.

The scaled and/or offset and color-converted LDR/baselayer image may then be converted back 86 to the coding color space. This scaled and/or offset, coding-color-space LDR/baselayer image may then be used to predict 87 a corresponding HDR block or image element.

Figure 9:
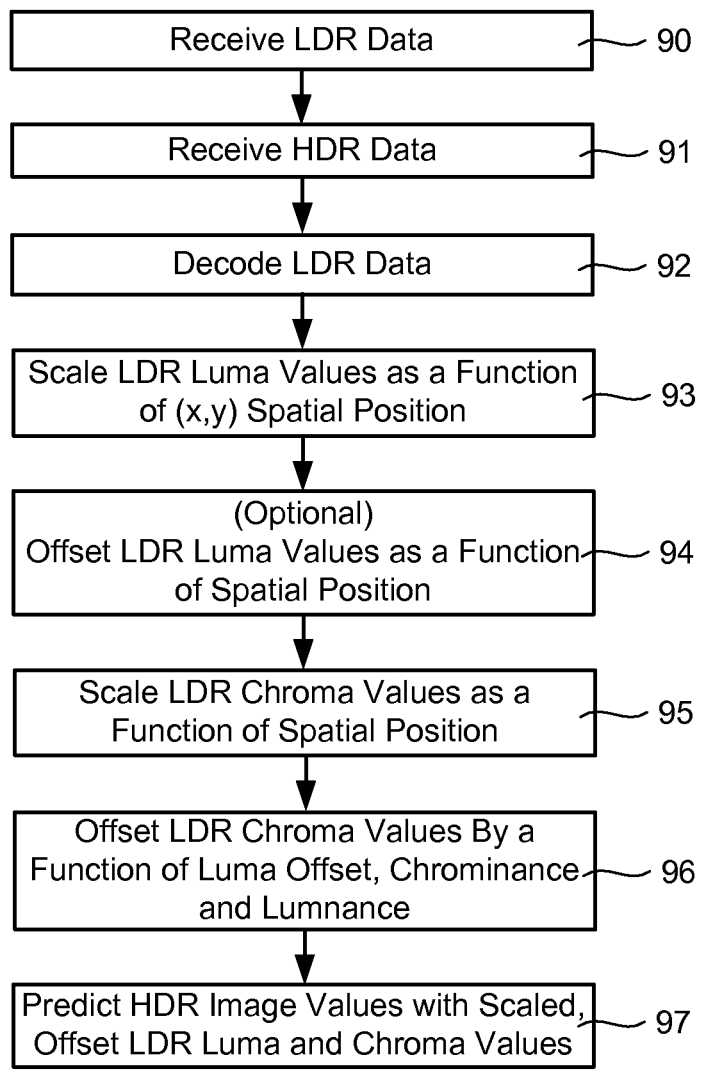
FIG. 9 is a chart showing an exemplary embodiment of the present invention comprising separate scaling and offset operations for luminance and chrominance elements.
Figure 10:
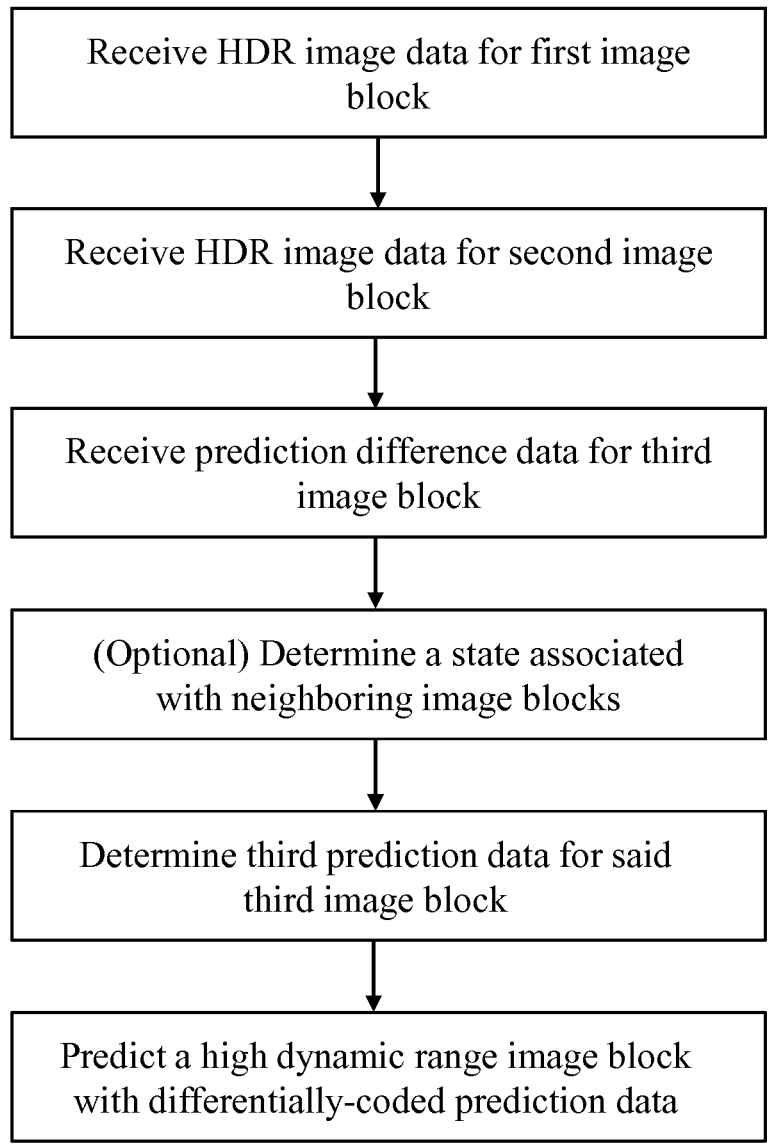
FIG. 10 is a chart showing an exemplary embodiment of the present invention comprising HDR image data and prediction difference data.
Figure 11:
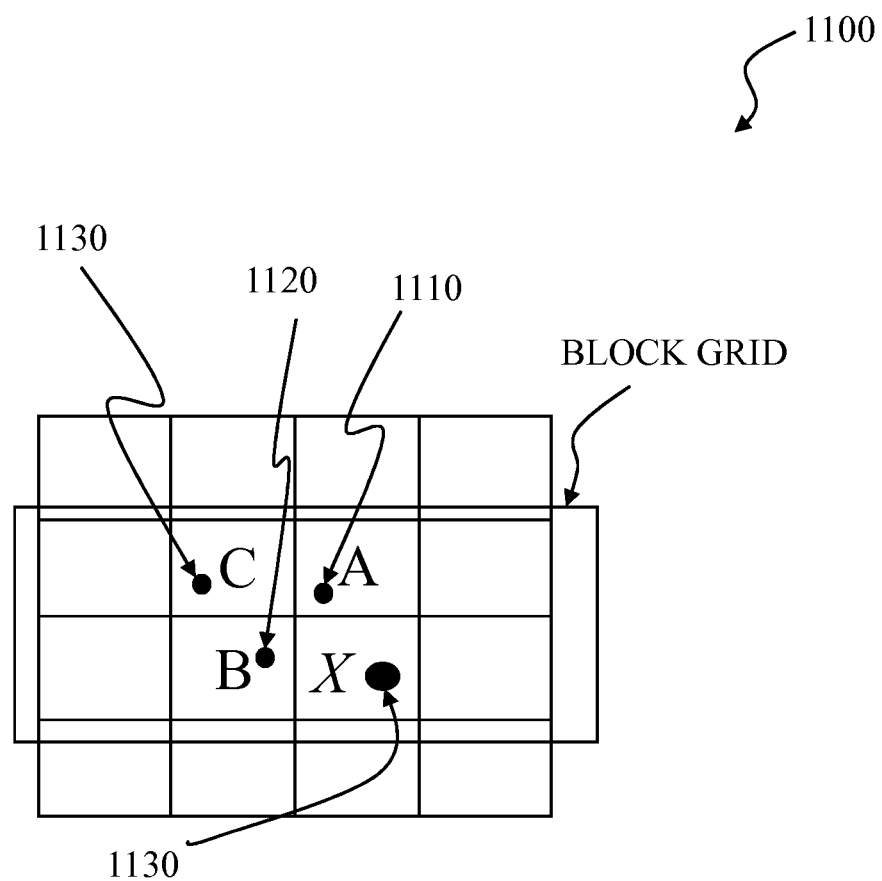
FIG. 11 depicts an exemplary structural relationship between various image blocks.

Some embodiments of the present invention may be described with reference to FIG. 9. In these embodiments, an LDR/baselayer image is received 90 and corresponding HDR/enhancement layer data is also received 91. An LDR/baselayer block or image element may then be decoded 92 from the LDR/baselayer image. In these embodiments, the decoded LDR/baselayer image may comprise separable luminance and chrominance values. In some embodiments, luminance values may be scaled 93 in relation to their spatial position in the image. Other factors may also affect the luminance value scaling operation. In some embodiments, these luminance values may be offset 94. The offset operation may also be related to the spatial position of the luminance value. In some embodiments, the chrominance values of the decoded LDR/baselayer image may be scaled 95. This chrominance scaling may also be related to the spatial position of the chrominance value. In some embodiments, chrominance values may also be offset 96. The chrominance value offset may be related to a luminance offset, a chrominance value or scaling factor and/or a spatial position of the chrominance value. Other factors may also affect the chrominance offset.

Once the luminance and chrominance values are scaled and/or offset, they may be used to predict 97 a corresponding HDR/enhancement layer image element.

In some embodiments, the inter-layer prediction process may be controlled at a fine granularity. As a specific example, the scaling and offset factors may vary on a 4×4 block basis. That is, for every 4×4 block in the image, an encoder may signal the appropriate scaling and offset factor. Additionally, an encoder may enable and disable inter-layer prediction on a block by block basis. This allows, for example, the high dynamic range image to be predicted from the low dynamic range image in a portion of the frame while predicted with alternative mechanisms in other spatial regions. Specifically, intra-frame and inter-frame prediction mechanisms may be utilized in these other spatial regions.

Exemplary Scaling Embodiments

Some embodiments of the present invention comprise inter-layer prediction methods that are multiplication free. In these embodiments, the baselayer data may be decoded and the decoded samples may be processed with a sequence of binary shifts and adds. In some embodiments, this may be accomplished with a process described by equation 1.

$$HDR(x, y) = \sum_{\forall i} a_i * LDR(x, y) << i \qquad (1)$$

where HDR and LDR are, respectively, the high dynamic range and low dynamic range version of the image sequence, x and y denote the spatial location within the image frame, and $a_i$ is a binary indicator that belongs to the set $\{-1,0,1\}$. Some embodiments may select i=$\{0,1,2,3\}$.

Alternative Exemplary Scaling Embodiments

Some inter-layer prediction embodiments comprise an offset in the inter-layer prediction process. Some embodiments may comprise a process described in equation 2.

$$HDR(x, y) = \sum_{\forall i} a_i * LDR(x, y) << i + \text{Offset}(x, y) \qquad (2)$$

where Offset(x,y) is the offset value. In some embodiments, the offset value may be signaled with the scaling values. Alternatively, it may be signaled as part of a residual refinement process.

Spatial Adaptivity

In some embodiments, control of the prediction process may be enabled at fine granularity. For example, when the baselayer video codec employs a block based structure 1100, the inter-layer prediction process may vary the scaling and offset parameters on a similar block grid. In some embodiments, this may be achieved by sending scaling and/or offset information from the encoder to the decoder within an enhancement bit-stream.

In some signaling embodiments, the scaling factors may be transmitted differentially. That is, the scale factor may be predicted from previously received scale factors. Then, a correction may be transmitted in the bit-stream. Some embodiments may predict the scale factor from the upper neighbor 1110 or left-most neighbor 1120 to the current block 1130. Alternatively, some embodiments may predict the scale factor as the minimum value of the upper 1110 or left-most neighbor 1120.

In addition, in some embodiments, the encoder may signal the correction value as a function of the upper 1110 and left-most neighbors 1120. For example, the encoder and decoder may utilize a specific context or state for signaling when the neighbors 1110, 1120, 1130 have the same scale factor. An alternative state may be utilized when the neighbors 1110 1120, 1130 have different scale factors.

High Level Syntax

Some embodiments of the present invention comprise high dynamic range video coding where the scale factor is the same throughout an image region. To accommodate these cases, high level information may also be transmitted from the encoder to the decoder. This high level information can disable the transmission of scaling and/or offset parameters on a block-by-block or region-by-region basis. For the case that transmission of the parameters is disabled, the high level information may comprise the scaling and/or offset information to be utilized. In some embodiments, this high level signaling will occur on a macroblock, slice, picture or sequence basis.

Transform Domain Processing

In some embodiments of the present invention, the inter-layer prediction process operates on intensity data. That is, the information is decoded and converted to the spatial domain by reversing any transform utilized for signaling. In alternative prediction embodiments, the scaling and offset operations may be directly applied in the transform domain. In these embodiments, the transform coefficients may be de-quantized and then scaled by scale factors. In some embodiments, transform coefficients may be processed differently depending on their frequency characteristics. For example, in some embodiments, the scaling operation may be applied solely to the AC coefficients while the offset operation may affect the DC component. In some embodiments, different scaling and offset operations may be signaled for different coefficients or coefficient types.

Some embodiments of the present invention may comprise a video codec that may adaptively switch between transform domain and spatial domain prediction mechanisms. In some embodiments, this switch may be signaled on a sequence, frame or slice basis. In some embodiments, this switch may operate at finer granularity, such as a block or macro-block.

Color and Color Space Issues

An issue in scalable, high dynamic range video coding is the management of color. In some embodiments of the present invention, a color transform may be used prior to inter-layer prediction. This addresses the fact that most color spaces utilized for video coding are not iso-luminant. For example, a video codec typically transmits data in the YCbCr color space with code word mappings defined in International Telecommunication Union, "Parameter Values for the HDTV standards for production and international programme exchange," ITU-R BT.709-5, April, 2002.

Some embodiments of the present invention perform an inter-layer prediction process in a color space closely related to the coding color space. In some exemplary embodiments, the color transform may be expressed in the following equations:

$$Y_{LDR} = Y_{LDR}$$

$$b = \frac{Cb_{LDR}}{Y_{LDR} + Cr_{LDR} + Cb_{LDR}}$$

$$y = \frac{Y_{LDR}}{Y_{LDR} + Cr_{LDR} + Cb_{LDR}}$$

where $Y_{LDR}$, $Cb_{LDR}$ and $Cr_{LDR}$ are the luma and chroma components in the low dynamic range image sequence, respectively. Then, the scaling and offset process may be applied to $Y_{LDR}$ to generate $Y_{HDR}$. Finally, the inter-predicted region may be computed with the following equations:

$$Y_{HDR} = Y_{HDR}$$

$$Cb_{HDR} = \frac{bY_{HDR}}{y}$$

$$Cr_{HDR} = \frac{(1-b-y)Y_{HDR}}{y}$$

where $Cb_{HDR}$ and $Cr_{HDR}$ are predictions for the color components in the high dynamic range layer.

In some embodiments wherein $Y_{LDR}$, $Cb_{LDR}$ and $Cr_{LDR}$ are not represented at the same resolution, the components may be resampled. In some exemplary embodiments, applications may down-sample the luma component when the chroma components are stored at lower resolution. Alternatively, the chroma components may be up-sampled to match the resolution of the luma component.

Alternative Color and Color Space Issues

In some embodiments of the present invention, inter-layer prediction may operate directly on the decoded data without employing a color transform. In some exemplary embodiments, the prediction process may be expressed by the following equations:

$$Y_{HDR}(x,y) = \text{Scale}(x,y,c) * Y_{LDR}(x,y) + \text{Offset}(x,y,c)$$

$$Cb_{HDR}(x,y) = \text{Scale}(x,y,c) * Cb_{LDR}(x,y) + \text{Offset}(x,y,c)$$

$$Cr_{HDR}(x,y) = \text{Scale}(x,y,c) * Cr_{LDR}(x,y) + \text{Offset}(x,y,c)$$

where the scaling and offset parameters are now a function of both spatial location and chroma component. That is, the reconstructed luma and chroma values are scaled with different scale factors.

In some exemplary inter-prediction processes, the luma and chroma values may be scaled with the same scale factor but with different offsets. This may be expressed with the following equations:

$$Y_{HDR}(x,y) = \text{Scale}(x,y) * Y_{LDR}(x,y) + \text{Offset}(x,y,c)$$

$$Cb_{HDR}(x,y) = \text{Scale}(x,y) * Cb_{LDR}(x,y) + \text{Offset}(x,y,c)$$

$$Cr_{HDR}(x,y) = \text{Scale}(x,y) * Cr_{LDR}(x,y) + \text{Offset}(x,y,c)$$

In these embodiments, the scale factor may not depend on the chroma component. In some embodiments, the encoder may transmit the offsets within the enhancement layer bit-stream.

In other exemplary embodiments of the inter-prediction process, the luma and chroma values may be scaled with the same scale factor and the offset for the chroma values may be dependent on the offset of the luma values as well as the decoded image data. This relationship may be expressed in the following equations:

$$Y_{HDR}(x,y) = \text{Scale}(x,y) * Y_{LDR}(x,y) + \text{Offset}(x,y)$$

$$Cb_{HDR}(x,y) = \text{Scale}(x,y) * Cb_{LDR}(x,y) + f(\text{Offset}(x,y), Cb_{LDR}(x,y), Y_{LDR}(x,y))$$

$$Cr_{HDR}(x,y) = \text{Scale}(x,y) * Cr_{LDR}(x,y) + f(\text{Offset}(x,y), Cr_{LDR}(x,y), Y_{LDR}(x,y))$$

where f( ) denotes a mapping operation.

An exemplary mapping operation may be expressed as:

$$f(\text{Offset}(x, y), A_{LDR}(x, y), Y_{LDR}(x, y)) = \text{Offset}(x, y) \frac{A_{LDR}(x, y)}{Y_{LDR}(x, y)}$$

where $A_{LDR}(x,y)$ denotes an arbitrary color component such as Cb or Cr.

As mentioned before, the chroma and luma components may be represented on different sampling grids. To address this problem, the chroma and luma data may be resampled to the same resolution. In some embodiments, a different mapping process may be employed. In some exemplary embodiments, the mapping relationship may be expressed as:

$$f(\text{Offset}(x, y), A_{LDR}(x, y), Y_{LDR}(x, y)) = \text{Offset}(x, y) \frac{\text{Avg}(A_{LDR}(x, y))}{\text{Avg}(Y_{LDR}(x, y))}$$

where Avg( ) denotes the mean operator. In another exemplary embodiment, the mean may be replaced with a summation operation. In other embodiments, non-linear operations such as the median, min and max operations may be beneficial.

In some exemplary embodiments, the mean operator (or an alternative operator) may be performed in a different domain than that of the Offset variable. In some exemplary embodiments, the mean operation may be computed in the transform domain by operating solely on the DC coefficient. Similarly, in embodiments wherein the spatial resolutions of the chroma and luma coefficients are not matched, the mean operation may be computed by analyzing multiple DC coefficients in the luma baselayer.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for predicting a high dynamic range image block with differentially-coded prediction data, said method comprising:
receiving high dynamic range (HDR) image data for a first image block, said first image block HDR image data comprising a first prediction data for said first image block, wherein said first prediction data comprises a scaling factor;
receiving high dynamic range (HDR) image data for a second image block, said second image block HDR image data comprising a prediction difference data related to said first prediction data, wherein said prediction difference data comprises a differentially-coded scaling factor;
determining a state associated with neighboring image blocks, wherein the state is for signaling whether or not the neighboring image blocks have the same scaling factor, and the determination is based on scaling factor of said first prediction data;
combining said first prediction data and said prediction difference data to determine second prediction data for said second image block; and
determining an HDR image block for the second image block based on the determined second prediction data for said second image block and the determined state.

2. The method of claim 1 wherein said first image block is an upper neighbor to said second image block.

3. The method of claim 1 wherein said first image block is a neighbor to the left of said second image block.

4. The method of claim 1 wherein said first image block is selected from a neighborhood around said second image block.

5. The method of claim 1 wherein said first image block is selected from an upper neighbor to said second image block and a left-hand neighbor to said second image block, wherein the selecting is based on the minimum value scale factor of an upper neighbor to said second image block and a left-hand neighbor to said second image block.

6. The method of claim 1 wherein said first prediction data further comprises an offset factor.

7. The method of claim 1 wherein said neighboring image blocks are image blocks selected from an upper neighbor and a left-most neighbor.

8. A method for predicting a high dynamic range image block with differentially-coded prediction data, said method comprising:
receiving high dynamic range (HDR) image data for a first image block, said HDR image data comprising first prediction data for said first image block, wherein said first prediction data comprises a scaling factor;
receiving high dynamic range (HDR) image data for a second image block, said HDR image data comprising second prediction data for said second image block, wherein said second prediction data comprises a scaling factor;
receiving prediction difference data for a third image block wherein said prediction difference data is differentially coded relative to at least one of said first prediction data and said second prediction data, and wherein said prediction difference data comprises a differentially-coded scaling factor;
determining a state associated with neighboring image blocks, wherein the state is for signaling whether or not the neighboring image blocks have the same scaling factor, and the determination is based on scaling factor of said first prediction data and scaling factor of said second prediction data; and
determining third prediction data for said third image block based on said prediction difference data, said second prediction data, said first prediction data, and the determined state.

9. The method of claim 8 wherein said second prediction data comprises a differential quantity related to said first image data.

10. The method of claim 8 wherein said first prediction data comprises an offset factor.

11. The method of claim 8 wherein said neighboring image blocks are image blocks selected from an upper neighbor and a left-most neighbor.

12. A device comprising:
   a decoder having a current image block and a previous image block, the current image block and the previous image block each comprising high dynamic range (HDR) image data, wherein the decoder is configured to:
      determine prediction data for the current image block based on prediction data comprising a scaling factor of a previous image block and prediction difference data comprising a differentially-coded scaling factor of the current image block, wherein the prediction difference data of the current image block is associated with the prediction data of the previous image block; and
      predict the high dynamic range image block of the current image block based on the determined prediction data of the current image block.

13. The device of claim 12 further comprising:
   an encoder configured to:
      enable data prediction for the current image block based on an offset factor.

14. A method for predicting a high dynamic range (HDR) image block comprising:
   determining, by a decoder, prediction data comprising a scaling factor for the current high dynamic range image block based on prediction data comprising a scaling factor of a previous high dynamic range image block and prediction difference data comprising a differentially-encoded scaling factor of the current image block, wherein the prediction difference data of the current image block is associated with the prediction data of the previous image block; and
   predicting, by the decoder, a high dynamic range image block of the current image block based on the determined prediction data of the current image block.

15. The device of claim 12 further comprising:
   an encoder configured to:
      determine a state associated with neighboring image blocks, wherein the state is for signaling whether or not the neighboring image blocks have the same scaling factor, and the determination is based on scaling factor of the prediction data of a previous image block.

16. The method of claim 14 further comprising:
   determining a state associated with neighboring image blocks, wherein the state is for signaling whether or not the neighboring image blocks have the same scaling factor, and the determining is based on scaling factor of the prediction data of a previous image block.

* * * * *